United States Patent Office 3,637,896
Patented Jan. 25, 1972

3,637,896
COPOLYMERISATION PROCESS
John Robert Jones, Walton-on-Thames, Surrey, and James Keith Hambling, Frimley, near Aldershot, Hampshire, England; said Jones assignor to The British Petroleum Company Limited, London, England
No Drawing. Continuation-in-part of application Ser. No. 558,588, June 20, 1966, now Patent No. 3,483,268. This application Apr. 16, 1968, Ser. No. 721,602
Claims priority, application Great Britain, May 2, 1967, 20,170/67
The portion of the term of the patent subsequent to Dec. 9, 1986, has been disclaimed
Int. Cl. C07c 3/10
U.S. Cl. 260—683.15 D                6 Claims

ABSTRACT OF THE DISCLOSURE

A mixture of olefins at least one of which is an alpha olefin is copolymerised in the presence of a catalyst comprising a complex organic compound of a metal of Group VIII of the Periodic Table according to Mendeleef e.g. nickel acetyl acetonate and an activating agent at a temperature in the range —40° C. to +200° C., under such conditions of pressure that the reactants are maintained in the liquid or partially condensed phase. The activating agent may be a Grignard reagent or metal alkyl e.g. an aluminium alkyl alkoxide.

REFERENCE TO COPENDING APPLICATION

This application is a continuation-in-part of copending U.S. Ser. No. 558,588, filed June 20, 1966, now U.S. 3,483,268.

This invention relates to a process for the production of low molecular weight copolymer of alpha olefins.

Processes for the polymerisation of alpha olefins in the presence of aluminium alkyls, either as the sole catalytic entity or in combination with a minor proportion of an activator, are known.

British patent specification No. 713,081, Ziegler discloses a process for the polymerisation of ethylene which comprises contacting ethylene at a temperature within the range 60–250° C. with an activator selected from hydrides of aluminium, gallium, indium and beryllium and derivatives of such hydrides in which one or more of the hydrogen atoms are substituted by hydrocarbon radicals selected from the group consisting of alkyl radicals and monovalent aromatic hydrocarbon radicals. In particular British patent specification No. 713,081 discloses the polymerisation of ethylene to butene-1 and higher linear alpha olefins by contacting ethylene with aluminium triethyl at 200–220° C. under super atmospheric pressure.

British patent specification No. 742,642, Ziegler discloses a process for the dimerisation of a mono-olefin containing more than two carbon atoms in the molecule which comprises heating the mono-olefin at a temperature within the range 60–250° C. in the presence of an activator selected from the hydrides of beryllium, aluminium, gallium and indium and derivatives of such hydrides in which one or more of the hydrogen atoms are substituted by hydrocarbon radicals selected from the group consisting of alkyl radicals and monovalent aromatic hydrocarbon radicals. In particular British patent specification No. 742,642 disclose the dimerisation of propylene to a product consisting predominantly of 2-methylpentene-1 by contacting propylene with aluminium triethyl at temperatures in the range 180–240° C. under superatmospheric pressure.

British patent specification No. 773,536, Ziegler discloses a process for the catalytic polymerisation of ethylene to form butene, hexene or higher liquid or solid paraffin-like polymers or mixtures thereof in the presence of an aluminium trialkyl of general formula

wherein $R_1$, $R_2$ and $R_3$ represent similar or dissimilar alkyls, in which the aluminium trialkyl is activated by nickel, cobalt or platinum. In particular British patent specification 773,536 discloses the polymerisation of ethylene to butene-1 and higher linear alpha olefins by contacting ethylene with aluminium triethyl and a minor proportion of nickel acetyl acetonate at 100° C. The advantage of the process described in British patent specification 773,536 is stated to be in the fact that it can be effected at much lower temperature.

One would expect therefore that the polymerisation of propylene and higher alpha olefins in the presence of a catalyst comprising an activating agent, for example an aluminium trialkyl and a complex nickel compound, for example nickel acetyl acetonate, would result in the production of a product consisting predominantly of branched chain olefins, for example, 2-methylpentene-1 and that this process could be effected at lower temperatures than those disclosed in British patent specification 742,642.

U.S. Pat. No. 3,483,268, issued out of copending application Ser. No. 558,588, discloses a process for the production of a product consisting predominantly of linear dimers having an internal double bond which process comprises dimerising an alpha olefin in the presence of a catalyst comprising a complex organic compound of a metal of Group VIII of the Periodic Table according to Mendeleef and an activating agent at a temperature in the range —40° C. to +200° C. under such conditions of pressure that the reactants are maintained in the liquid or partially condensed phase.

Dimerising an alpha olefin in the presence of a catalyst comprising a relatively large proportion of the complex organic compound and the activating agent results in the production of a product which consists predominantly of linear dimers having an internal double bond. Such linear dimers are suitable for use in the manufacture of biodegradable detergents.

The present invention provides a process for the production of a product containing low molecular weight copolymers of alpha olefins which process comprises copolymerising a mixture of olefins at least one of which is an alpha olefin in the presence of a catalyst comprising a complex organic compound of a metal of Group VIII of the Periodic Table according to Mendeleef and an activating agent at a temperature in the range —40° C. to +200° C., under such conditions of pressure that the reactants are maintained in the liquid or partially condensed phase.

Suitable activating agents are Grignard reagents, metal alkyls and other organometallic compounds.

The preferred complex organic compounds are nickel complexes containing groups derived from β ketones of the formula $R_1COCH_2COR_2$ or β ketoesters of formula $R_3COCH_2COOR_4$ where $R_1$, $R_2$, $R_3$ and $R_4$ are alkyl, aryl, aralkyl, cycloalkyl or other inert groups.

The preferred complex organic compound is nickel acetyl acetonate.

Preferably the moisture content of the nickel acetyl acetonate is reduced to below 3% by weight before use. In general, the lower the moisture content the better.

The preferred activating agents are organo aluminium compounds, most preferably aluminium alkyl alkoxides. The preferred aluminium alkyl alkoxide is aluminium diethyl ethoxide. Aluminium trialkyls, e.g. aluminium triethyl are also suitable.

Aluminium dialkyl alkoxides are preferred because they react gently with the complex organic compound and catalysts of consistent quality are obtained in successive preparations. Some other activating agents e.g. aluminium trialkyls, react more vigorously and render temperature control of the catalyst preparation reaction more difficult. As a result, it is more difficult to obtain catalysts of consistent quality. Nevertheless, useful catalysts are obtained from such agents.

The preferred olefins for copolymerisation contain 2–6 carbon atoms per molecule although higher molecular weight alpha olefins may also be copolymerised. Particularly preferred olefins are ethylene, propylene and butene-1.

Internal olefins such as hexene-2 and hexene-3 may also be copolymerized with alpha olefins, but the reaction is much slower and the major codimer products are of branched chain structure.

Polymerisations involving ethylene are preferably effected under a pressure in the range 200 to 2000 p.s.i.g., whilst for higher olefins the pressure should be sufficient to maintain the olefin at least partially in the liquid phase. For normally liquid olefins, the pressure may be atmospheric or even lower.

The molar ratio of the Group VIII compound to the activating agent is suitably in the range 2:1 to 0.1:1. In the case of aluminium diethylethoxide and other metal dialkyl compounds the preferred ratio is 1.0:0.8 to 1:2.0. The preferred range for trialkyl aluminium compounds such as aluminium triethyl is 1.0:0.5 to 1.0:1.5, while for monoalkyl compounds such as aluminium ethyldiethoxide and n butyl lithium the preferred range is 1.0:1.5 to 1.0:4.0.

The catalyst may be prepared by adding the complex organic compound of the Group VIII metal and the activating agent to an inert diluent. Suitable diluents include normally liquid hydrocarbons and halogenated hydrocarbons. The preferred diluents are aromatic and halogenated aromatic liquids e.g. benzene, toluene, xylene and chlorobenzene and ethers e.g. tetrahydrofuran and diethylene-glycol-dimethyl ether. These compounds act as solvents for both components and thus produce a homogeneous catalyst system which is of increased reproducible activity when compared with heterogeneous systems.

Preferably the catalyst system is produced in situ e.g. by storing the catalyst and activator in separate containers and breaking the containers and allowing the components to mix in the presence of the mixture of olefins, or by introducing the two catalyst components separately into a flowing stream of the liquid olefin mixture at the entrance to the reactor.

If the catalyst system is prepared in the absence of olefins it should be used immediately after preparation or stored at temperatures below about 0° C. The catalyst system may be stored for limited periods at about ambient temperature if prepared in the presence of olefins. For this purpose alpha olefins such as hexene-1,3-methylpentene-1 and 4-methylpentene-1 are most suitable but internal olefins such as hexene-2, hexene-3 and 4-methylpentene-2 may also be used either alone or in admixture with alpha olefins. In all these cases however it is preferable to use the catalyst as soon as possible.

Polymerisation is then effected in the presence of the catalyst dispersion or solution.

The catalyst must be preserved from contact with water, oxygen, alcohols, acids, amines, phosphines, sulphur compounds, dienes, acetylenes, carbon monoxide and other complexing ligands which displace olefins from transition metal complexes. The presence of substantial quantities of these materials will destroy or reduce the efficiency of the catalyst.

The invention is illustrated by the following examples.

EXAMPLE 1

Ethylene-propylene copolymerisation

Nickel acetylacetonate (1.3 g.) dissolved in 50 cc. toluene was placed in a 1-litre autoclave with 0.65 g. aluminium diethylethoxide in 8 cc. toluene in a separate flask so that the two solutions did not mix. Care was taken to ensure that air and moisture were absent from the apparatus and materials used. The autoclave was sealed and filled through a valve with a 1:1 molar mixture of ethylene and propylene at 1000 p.s.i. and the flasks containing catalyst and activator broken, causing the components to mix in the presence of the olefin mixture. The autoclave was heated to 40° C. and rocked to mix the contents thoroughly. Rocking was continued at 40° C. for 18¾ h. The contents of the autoclave were then vented off into cooled traps and were found to contain toluene, unreacted ethylene and propylene and 63 g. olefinic polymers consisting of butenes (1.7%), pentenes (7.7%), hexenes (17.6%), heptenes (27.8%), octenes (23.6%), nonenes (13.0%) and decenes and higher molecular weight polymers (8.6%). Most of the polymer was straight chained material, the hexenes containing 80% linear hexenes, the heptenes 63% linear heptenes, the octenes 34% linear octenes and the nonenes 53% linear nonenes.

EXAMPLE 2

Ethylene-butene-1 copolymerisation

The catalyst was used exactly as in Example 1 except that the feed to the autoclave was a 1:1 molar mixture of ethylene and butenes the butenes containing 78% butene-1 and 22% butene-2 with less than 10 p.p.m. butadiene. The total pressure was 1000 p.s.i. The autoclave was rocked at 40° C. for 18½ h. The products were then vented off into cooled traps and were found to contain toluene, unreacted ethylene and butenes, including some butenes formed by dimerisation of ethylene and 81 g. of olefinic polymers. The polymers consisted of 19.8 g. hexenes of which 85% was linear hexenes, 20.9 g. octenes of which 78% was linear octenes and 40.7 g. of higher molecular weight polymers.

EXAMPLE 3

Propylene-butene-1 copolymerisation

The catalyst was used exactly as in Example 1 except that the feed to the autoclave was a 1:1 molar mixture of propylene and butenes, the butenes consisting of 78% butene-1 and 22% butene-2 with less than 10 p.p.m. butadiene. The autoclave was rocked at 40° C. at a total pressure of 600 p.s.i. for 16½ h. The contents of the autoclave were then vented off into cooled traps and were found to contain toluene, and unreacted propylene and butenes and 107 g. of liquid polymers. The polymers consisted of hexenes (28.0%) of which 76% was linear hexenes, heptenes (36.5%) of which 84% was linear heptenes, octenes (16.0%) of which 85% was linear octenes and higher molecular weight polymers (19.5%).

What we claim is:

1. A process for the production of a product consisting predominantly of linear codimers having an internal double bond, which process comprises: codimerising a mixture of at least two mono-olefins, each containing 2 to 6 carbon atoms per molecule, in the presence of a catalyst consisting essentially of nickel acetyl acetonate and an activating agent selected from the group consisting of aluminium alkyl alkoxides and aluminium trialkyls, the molar ratio of nickel acetyl acetonate to activating agent being in the range of 2:1 to 0.1:1 at a temperature in the range of −40° to 200° C., under such conditions of pressure that the reactants are maintained in a liquid or partially condensed phase.

2. A process according to claim 1, wherein the activating agent is an aluminium dialkyl alkoxide.

3. A process according to claim 2, wherein the molar ratio of the nickel acetyl acetonate to the activating agent is in the range of 1.0:0.8 to 1:2.

4. A process according to claim 1, wherein the activating agent is an aluminium trialkyl.

5. A process according to claim 4, wherein the molar ratio of the nickel acetyl acetonate to the activating agent is in the range 1.0:0.5 to 1:1.5.

6. The process of claim 1 wherein said olefins are selected from the group consisting of ethylene, propylene and butene-1.

References Cited

UNITED STATES PATENTS

| | | | |
|---|---|---|---|
| 3,306,948 | 2/1967 | Kealy | 260—280 |
| 3,321,546 | 5/1967 | Roest et al. | 260—683.15 |
| 3,364,278 | 1/1968 | Reusser | 260—683.15 |
| 3,379,706 | 4/1968 | Wilke | 260—683.15 X |
| 3,405,194 | 10/1968 | Iwamoto et al. | 260—680 |
| 3,424,815 | 1/1969 | Cannell et al. | 260—683.15 |
| 3,452,115 | 6/1969 | Schneider | 260—683.15 |
| 3,483,268 | 12/1969 | Hambling et al. | 260—683.15 |

FOREIGN PATENTS

| | | | |
|---|---|---|---|
| 1,468,068 | 12/1966 | France | 260—683.15 |
| 6612339 | 3/7967 | Netherlands | 260—683.15 |

PAUL M. COUGHLAN, Jr, Primary Examiner